UNITED STATES PATENT OFFICE.

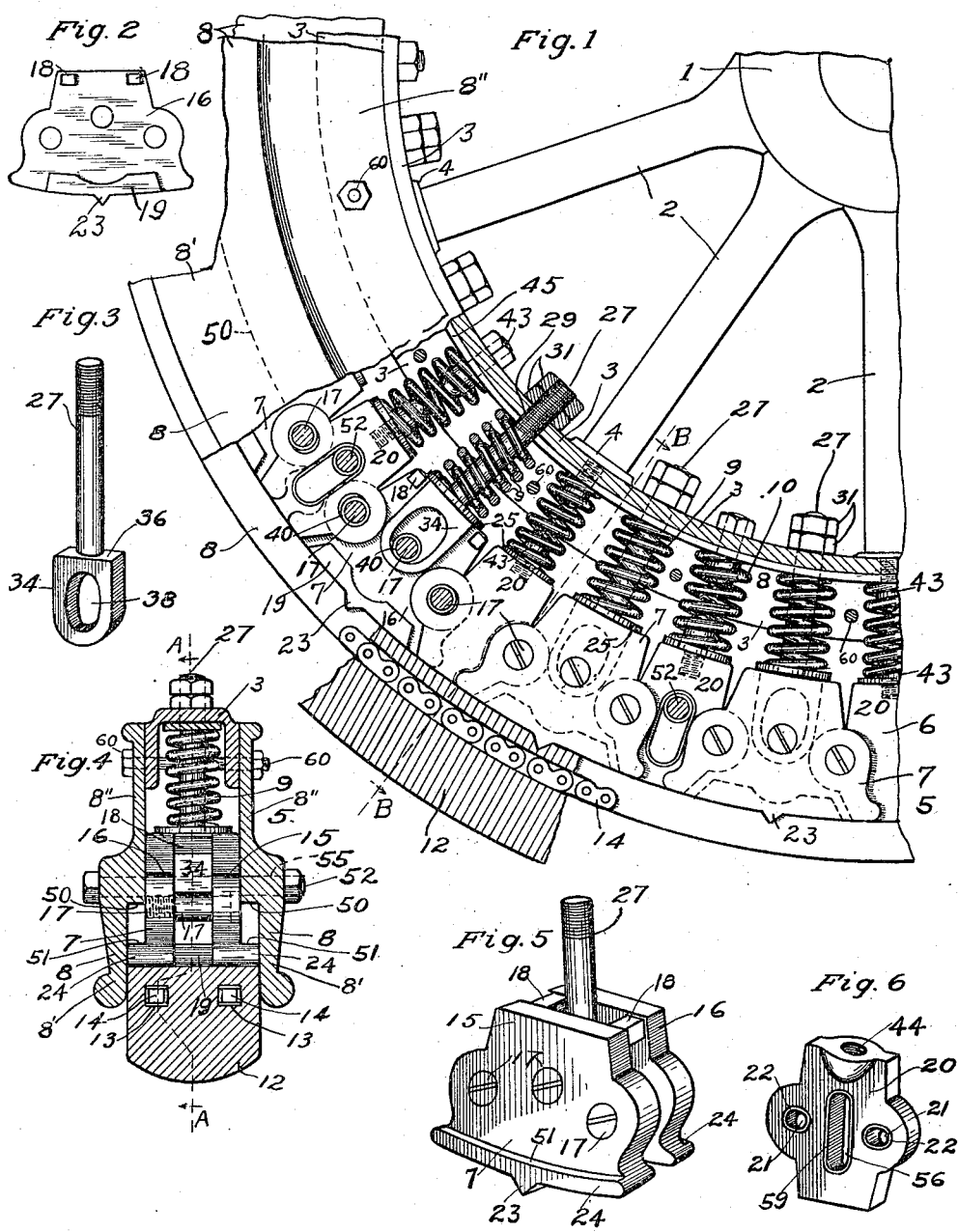

WILLIAM W. SONNE, OF MORTON GROVE, ILLINOIS.

SPRING-WHEEL.

1,281,221.  Specification of Letters Patent.  Patented Oct. 8, 1918.

Application filed August 24, 1914. Serial No. 858,216.

*To all whom it may concern:*

Be it known that I, WILLIAM W. SONNE, a citizen of the United States of America, and a resident of Morton Grove, county of Cook, and State of Illinois, have invented certain new and useful Improvements in Spring-Wheels, of which the following is a specification.

This invention relates to vehicle wheels adapted to absorb shock, and more particularly to the type known as spring wheels.

The main objects of this invention are to provide an improved form of spring wheel having few parts of simple and inexpensive construction and adapted to be interchanged readily; to provide an improved construction of pivotally jointed tread rim and yielding support means therefor adapted for great strength and durability; to provide an improved form of housing for the tread member and its elastic backing, adapted to give lateral guidance and support, both to the jointed rim, and to the tire proper when such is used, and also adapted to provide for equalization and distribution of the load; and to provide an improved form of tread shoes and connecting means therefor.

An illustrative embodiment of this invention is shown in the accompanying drawings, in which—

Figure 1 is a fragmentary side elevation of the wheel, part of the rim and associated parts being shown in front elevation, part in vertical section on the line A—A of Fig. 4, and part being shown with the front guide ring broken away.

Fig. 2 is an elevation view of one of the shoe plates having spacing shoulders thereon.

Fig. 3 is a perspective view of one of the guide bolts for the shoe springs.

Fig. 4 is a transverse section of the rim and associated parts on the line B—B of Fig. 1.

Fig. 5 is a perspective view of one of the main sectors or bearing shoes of the jointed tread member.

Fig. 6 is a perspective view of one of the shoe connecting links.

In the embodiment shown, the wheel comprises a hub 1 and spokes 2 of usual form, together with a combined felly, rim and tire construction embodying the several features of this invention.

The felly 3 is rigid and is in the form of an outwardly facing annular channel bar or ring, to the back of which the outer ends of the spokes are attached, as at 4. The rim 5 as a whole is resilient in character and comprises a flexible tread rim 6 made up of an annular series of pivotally connected sectors or shoes 7, lateral guide rings or cheek plates 8 therefor, and yielding support means 9 and 10 for the jointed member 6.

The tire 12 may be of any desired form, but is preferably made solid and of resilient materials such as rubber or the like. Said tire is substantially uniform and continuous and is preferably reinforced, for which purpose it is formed with one or more longitudinal perforations 13, each containing a chain 14 or the like, preferably of the usual sprocket link type.

Each of the shoes 7 constituting the jointed rim 6 comprises a pair of plates 15 and 16 fastened together by any suitable means, screw 17 being preferred, said plates being held in spaced relation by shoulders 18 and 19 formed on one of the plates 16 adjacent to its inner and outer edges respectively. Links 20 connect adjacent shoes, each link having perforated ends formed and adapted to project between the shoe plates 15 and 16 where said ends having perforations 21 are secured pivotally by certain of the screws 17 at the ends of the shoes 7. The link holes 21 are elongated peripherally of the wheel and each is fitted with a wear bushing 22.

In order to prevent creeping of the tire 12 on the rim 6, each shoe 7 is provided with one or more transverse ribs 23 on its outer face. Each shoe plate 15 and 16 has an outward flange 24 arranged to increase the width of the shoe tread. The plates 7 are countersunk to receive the heads of the screws 17 flush with the outer surface. The screw holes in the plates 16 are threaded so that the screw ends need not project.

The yielding support means 9 and 10 are made in the form of helical springs, and are formed to fit at their inner ends in the hollow of the felly channel 3, the outer ends being seated against the inwardly facing edges of the shoes 7 and links 20 respectively. Washers 25 are interposed to take the wear from the said shoes and links. Said springs are preferably double in character, including concentric outer and inner parts, as shown in Fig. 1 where one of the outer spring parts is shown in section so as to disclose the inner part.

Guide means are provided for the springs 9 in the form of bolts or plunger-rods 27 disposed coaxially in each of said springs. The inner end of each bolt projects through a hole 29 in the floor of channel 4 in tight fitting relation thereto and has stop means, as one or more nuts 31, on its tip to prevent withdrawal outward from the felly hole 29. Each bolt 27 has on its outer end a head 34 flattened longitudinally to fit between the shoe plates 15 and 16 and is preferably shouldered at 36, said head being perforated at 38 to receive one of the screws 17 centrally positioned on the shoe 7. The perforation 38 is elongated lengthwise of the bolt to permit radial movement of the shoe and bolt with respect to each other, said hole also being wide enough to permit some movement of the head crosswise of the slot. The tread plate shoulders 18 and 19 are spaced apart enough to give substantially free play for the bolt head 34 on its pivot 17. Interchangeable bushings 40 are fitted loosely one on each screw 17 to take the wear of the coacting parts. Preferably, and especially for heavy service, the bolts 27 have a plurality of said springs 9 arranged concentrically and wound in opposite directions.

The springs 10 are mounted without guide bolts, but their ends are placed over oppositely projecting studs or centering shoulders 43 preferably in the form of screws or the like, having tall rounded heads, said screws being set in the adjacent faces of the links 20 and channel 4. Each link 20 is tapped at 44 to receive a screw 43. The washers 25 for the outer ends of springs 10 are preferably held in place under the heads of the screws 43. A wear plate suitably perforated in registry with said felly, and preferably in the form of a metal band or hoop 45 is disposed in the bottom of the felly channel 4 to receive the inner ends of the springs 9 and 10.

The guide rings 8 are substantially flat but each is thickened somewhat along its peripheral center, and the outward flange 8' is offset slightly from alinement with the inner flange 8'', an outwardly facing shoulder being provided on the inner side of the ring at 50. The ring shoulders 50 are adapted to coact with the shoulders 51 on backs of the flanges 24 of the tread shoes 7 when the latter are forced inward sufficiently against the compression of springs 9 and 10. The outward flange 8' overlaps the inner portion of the tire 12 and so retains the same in its position surrounding the jointed tread rim 6.

Connecting means for the guide rings 8 and tread rim 6 are provided in the form of bolts 52 disposed transversely of the wheel in registering apertures 55 and 56 in the guide rings 8 and links 20 respectively. In alternate links 20 the slots 56 and bolts 52 may be omitted if desired. Said bolts 52 fit tightly in the apertures 55 and serve to rigidly brace and strengthen the guide plates 8. The slots 56 are each disposed radially across the middle portion of said links, and the holes 55 are preferably disposed in the thickened portion of each of said rings 8. The bolts 52 disposed in said apertures serve to prevent creeping of the rim 6 and hold the tread members and guide rings in definite relation peripherally. The slots 56 permit free radial movement, within certain limits, of the links 20 and associated parts with respect to the guide rings 8. Each slot 56 is fitted with a wear bushing 59. The plates 8 are preferably secured rigidly to the felly 3 at their inner edges, as by means of bolts 60 or the like fitting tightly in place, although if the bolts 60 and apertures therefor are omitted, the bolts 52 and the springs will serve to hold the parts in operative position and to equalize and cushion the shocks.

One of the especially desirable features of the foregoing construction is the adaptability for surrounding the link members and associated mechanism with suitable lubricant, commercial lubricating grease being adapted for the purpose. When such lubricant is used it is placed in the casing between the felly member 3 and the flexible tire 12, the latter fitting tightly between the rim flanges 8 and 8' in such manner as to retain the lubricant, which in operation distributes itself throughout the casing and thoroughly lubricates all of the moving parts, both with respect to one another and with respect to the casing walls. The inner part of the tire 12 is preferably formed of canvas impregnated with rubber as commonly used and understood in the art, or a canvas or leather gasket (not shown) may be interposed between the rubber tire and the jointed tread rim to prevent leakage of oil and to protect the tire.

Ordinarily the tension of the springs is given a final adjustment initially, which usually never has to be changed afterward, though the nuts on the inner ends of the bolts 27 and 43 facilitate readjustment when desirable or necessary. In practice, the beneficial result of the use of lubricant as above described is apparent, and has been found to enhance the easy running of the vehicle and to prevent wear on the above mentioned operating parts of the wheel. Because of the foregoing features the wheel is adapted for rough stony roads such as are common in hilly regions, as well as for soft and boggy roads such as are encountered especially at some seasons of the year in flat level places.

In use, the various members operate as follows:—

When the roadway is smooth, the load is distributed nearly uniformly over a plurality of shoes, in which case the adjacent springs 9 and 10 coöperate to cushion the tread and permit the bearing shoes to move inward somewhat from their normal position, particularly at the point directly under the center of the wheel. Normally the play in the outer ends of the guide bolts permits the shoe to move sufficiently without thrusting the bolt inward, but in case the load is heavy, or if the road is rough, the guide bolt will be forced inward by a plunger-like action. The inward movement of the shoes 7 is limited by the coacting shoulders 50 and 51 on the guide rings and shoes.
The elongated apertures in the links 20 and the resulting looseness of fit permits ready self adjustment of the tread rim 6 to the slight variations in length resulting from the inward movement of part of the tread members. As a result of the construction shown, the shoes directly under the center are depressed sufficiently to bring the adjacent shoes into bearing, and thus the load is distributed over a larger ground area.
This is favorable to easy running, especially when the roads are soft.

Although but one specific embodiment of this invention has been herein shown and described, it will be understood that numerous details of the construction shown may be altered or omitted without departing from the spirit of this invention as defined by the following claims.

I claim:—

1. A spring wheel, comprising a felly and flexible tread and tread supporting means mounted yieldably on said felly, in combination with a pair of guide rings disposed in tight fitting relation on opposite sides of said felly and overlapping the inner part of the tread means, fastening means carried by said guide rings and connecting said guide rings and tread supporting means and arranged to permit limited relative movement of said supporting means and guide rings radially, said tread supporting means comprising a jointed rim having radially disposed flat links overlapping and connecting the segments proper of said rim which nearly abut together, and said jointed rim having transverse perforations spaced apart peripherally in said links respectively and between said segments to receive said fastening means, and yielding cushion means bearing inward against said felly for each of said links for urging the links yieldingly outward.

2. In a spring wheel, a tread shoe comprising a pair of detachably connected plates having means formed and arranged for holding the same spaced apart, in combination with a bolt having one end secured loosely between said plates, a helical spring carried by said bolt, a pivot disposed through said shoe transversely of said plates, said bolt having a longitudinal aperture for said pivot and being swingable thereon at said one end, and fastening means at each end of said shoe for holding said plates together.

3. In a spring wheel, a tread shoe comprising a pair of plates disposed side by side in spaced relation, one of said plates having inwardly projecting shoulder means formed and arranged to bear against the adjacent plate to hold said plates apart, tension means connecting said plates for holding them together, and a radially disposed bolt having a helical spring thereon and having its outer or head end secured loosely between said plates, the head of said bolt being formed flat to prevent turning and having a perforation to receive one of the said tension means in loose fitting relation whereby the bolt head may have restricted movement in any direction in the plane of said link.

4. In a spring wheel, a tread shoe comprising a pair of plates disposed radially side by side, means carried by said plates for holding the same apart in definite spaced relation, said means comprising a shoulder disposed centrally at the outer edge of one of the plates and a pair of shoulders disposed at the opposite ends of one of said plates adjacent to its inner edge, and fastening means for detachably securing said plates together.

Signed at Chicago this 21st day of August, 1914.

WILLIAM W. SONNE.

Witnesses:
FRED M. DAVIS,
WILLIAM E. HANN.